(12) United States Patent
Sun

(10) Patent No.: US 6,179,321 B1
(45) Date of Patent: Jan. 30, 2001

(54) DETACHABLE HANDRAIL OF A BABY STROLLER

(75) Inventor: Chien-wei Sun, Hsin Chu (TW)

(73) Assignee: Kingstar Baby Carriages Co., Ltd. (TW)

( * ) Notice: Under 35 U.S.C. 154(b), the term of this patent shall be extended for 0 days.

(21) Appl. No.: 09/632,495

(22) Filed: Aug. 3, 2000

(30) Foreign Application Priority Data

Feb. 15, 2000 (CN) ................................ 089202521

(51) Int. Cl.$^7$ ............................................. B62B 7/06
(52) U.S. Cl. ..................... 280/658; 280/647; 280/655; 280/655.1
(58) Field of Search ................... 280/638, 639, 280/642, 643, 647, 655, 655.1, 657, 658

(56) References Cited

U.S. PATENT DOCUMENTS

| | | | |
|---|---|---|---|
| 5,168,601 | * 12/1992 | Liu | 280/655.1 |
| 5,184,835 | * 2/1993 | Huang | 280/655.1 |
| 5,364,119 | * 11/1994 | Leu | 280/647 |
| 5,725,238 | * 3/1998 | Huang | 280/642 |
| 5,741,021 | * 4/1998 | Saint et al. | 280/642 |
| 5,775,718 | * 7/1998 | Huang | 280/647 |
| 5,938,230 | * 8/1999 | Huang et al. | 280/647 |
| 6,000,713 | * 12/1999 | Lin | 280/655 |
| 6,045,145 | * 4/2000 | Lan | 280/658 |
| 6,068,284 | * 5/2000 | Hakuda | 280/655 |
| 6,116,624 | * 9/2000 | Hu | 280/658 |

FOREIGN PATENT DOCUMENTS

0301828 * 2/1989 (EP) ................................ 280/658

* cited by examiner

*Primary Examiner*—Richard M. Camby
(74) *Attorney, Agent, or Firm*—Martine Penilla & Kim, LLP

(57) ABSTRACT

A combined handrail-and-frame structure of a baby stroller includes an assembly and an engaging seat wherein the assembly 8 includes an inner seat, a first fastener, a second fastener, a spring, and a housing. A hook with a lead inclined surface is provided in each of the first and second fasteners, and a convex push button is provided at the top of the second fastener. Moreover, a positioning head having an engaging fork is provided at an end of the assembly, and a spring installed in between the first and the second fasteners is also provided. In addition, a slit for clipping the engaging fork and an opening having a first and a second edge is provided in the engaging seat to be hooked up by the hooks for positioning the engaging fork in horizontal and vertical directions. When it comes to detaching, the push button is press to compress the spring, and the two hooks will be unlocked such that the assembly can be separated from the engaging seat.

6 Claims, 5 Drawing Sheets

DETACHABLE HANDRAIL OF A BABY STROLLER

BACKGROUND OF THE INVENTION

1. Field of Invention

The invention relates to a handrail of a baby stroller, and more particularly to a combined handrail-and-frame structure of a baby stroller.

2. Related Art

Shown in FIG. 1 and FIG. 2 are isometric views of the combined handrail-and-frame structures of a conventional baby stroller. As shown in FIG. 1 and FIG. 2, the conventional baby stroller includes a main body 11 and a clip 12. Both an end of the main body 11 and the clip 12 itself appear a half-tube in shape. They are both pivotally connected to the frame 14 of the stroller to form a sleeve that is fitted around the circumference of the frame 14. The other end of the main body 11 is connected to the handrail 13. Moreover, a fin 121 positioned at a side and on the outer surface of the clip 12 is provided as a handle for pushing and pulling the slip with respect to the pivot for opening and positioning. The detaching and attaching the "main body 11 and clip 12" from and to the frame need to open and close the fin 121, thereby, it is very inconvenient.

But since the connection between the slip 12 and the frame 14 relies only on the shrink fitting by making use of the resilient nature of the slip 12 itself, the clip structure 12 can not ensure positive positioning action. Moreover, the protruded appearance of the fin 121 not only causes inconvenience but also shows bad aesthetic perception.

SUMMARY OF THE INVENTION

Therefore, it is one of the objectives of the invention to provide a combined handrail-and-frame structure that can positively and quickly detach the handrail from the frame and attach the handrail back to frame.

It is another objective of the invention to provide a combined handrail-and-frame structure that can positively position the handrail in horizontal and vertical directions.

It is yet another objective of the invention to provide a combined handrail-and-frame structure that can shows good aesthetic perception, and improve the quality level of the product.

In order to attain the foregoing and other objectives, a combined handrail-and-frame structure of a baby stroller of the invention includes an assembly and an engaging seat wherein the assembly includes an inner seat, a first fastener, a second fastener, a spring, and a housing. A hook with a lead inclined surface is provided in each of the first and second fasteners, and a convex push button is provided at the top of the second fastener. Moreover, a positioning head having an engaging fork is provided at an end of the assembly, and a spring installed in between the first and the second fasteners is also provided. In addition, a slit for clipping the engaging fork and an opening having a first and a second edge is provided in the engaging seat to be hooked up by the hooks for positioning the engaging fork in horizontal and vertical directions. When it comes to detaching, the push button is pressed to compress the spring, and the two hooks will be unlocked such that the assembly can be separated from the engaging seat.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
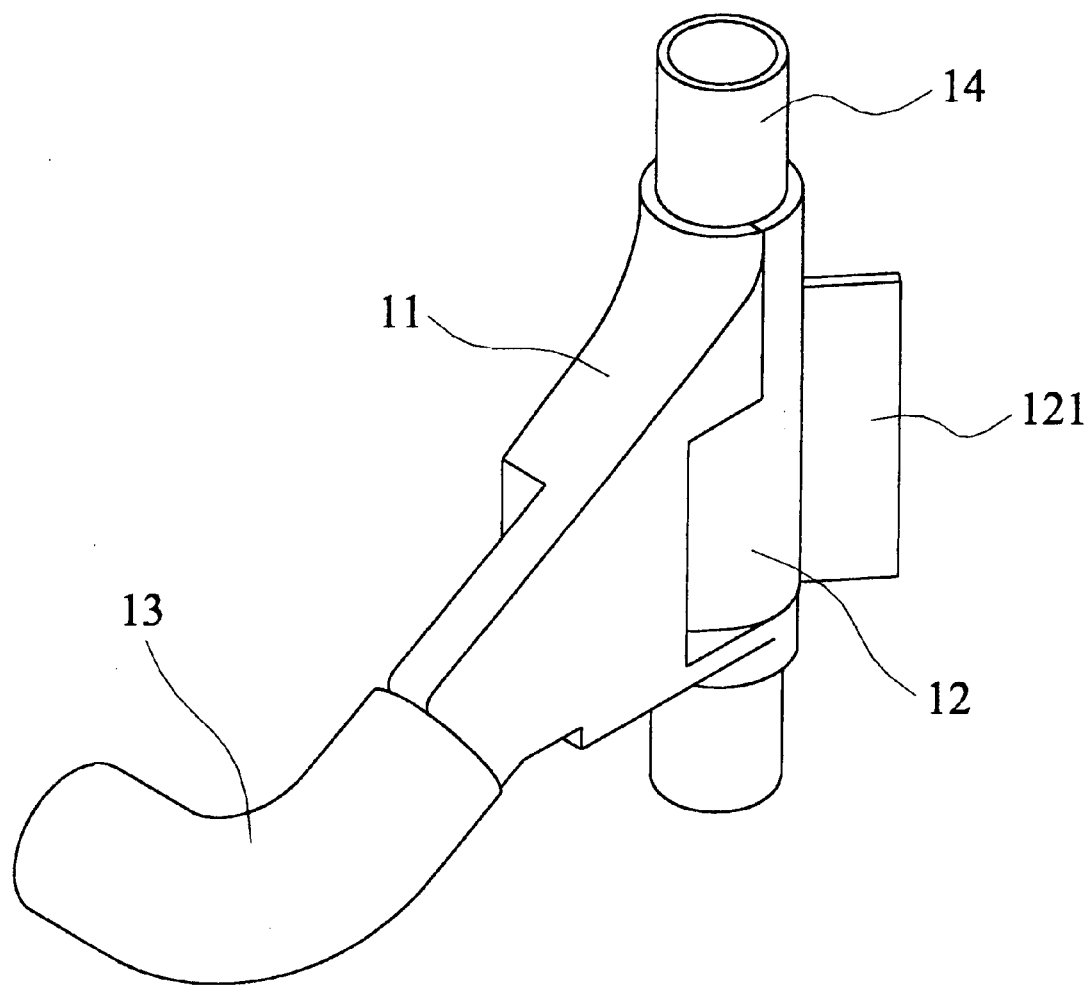
FIG. 1 is an isometric view of the combined handrail-and-frame structures of a conventional baby stroller in attaching condition.
Figure 2:
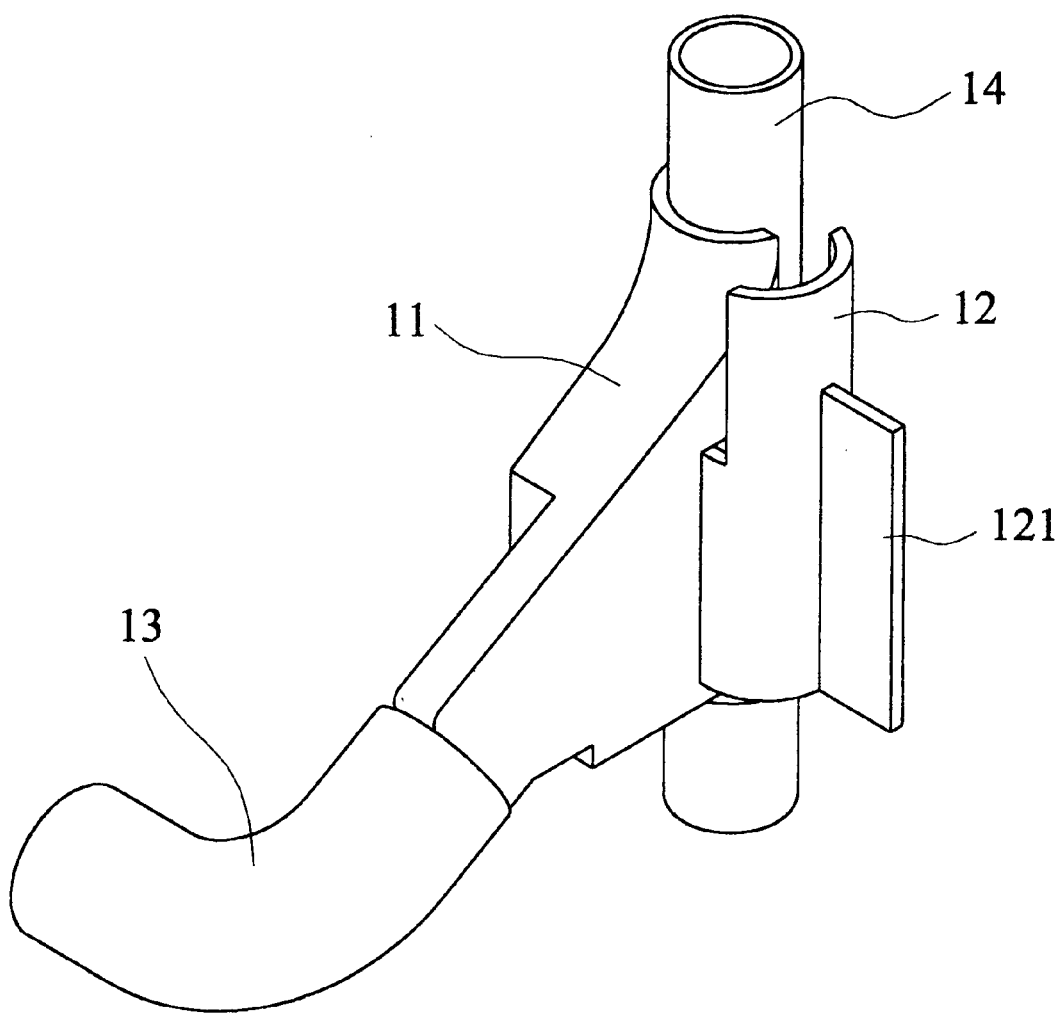
FIG. 2 is an isometric view of the combined handrail-and-frame structures of a conventional baby stroller c.
Figure 3:
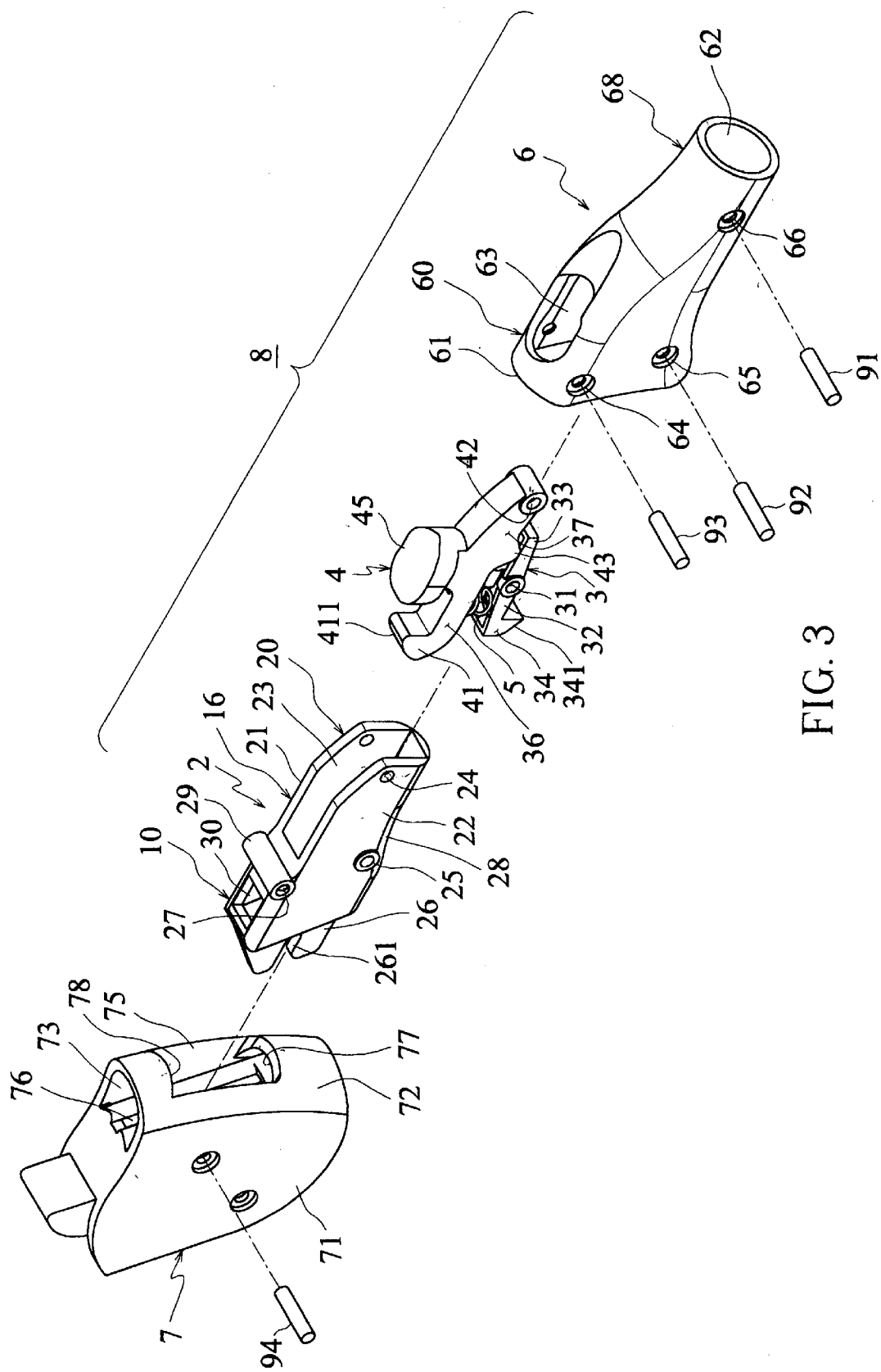
FIG. 3 is an isometric exploded view of the combined handrail-and-frame structures of baby stroller according to a preferred embodiment of the present invention.

FIG. 3 is an isometric exploded view of the combined handrail-and-frame structures of baby stroller according to a preferred embodiment of the present invention. As shown in FIG. 3, the combined handrail-and-frame structures of the invention includes an assembly 8 and an engaging seat 7 wherein the assembly 8 includes an inner seat 2, a first fastener 3, a second fastener 4, a spring 5, and a housing 6. The inner seat 2 is a channel-like member including a first end 10, a central section 16 and a second end 20. The inner seat 2 having two parallel side plates 21 and 22 and a containing space 23 between the side plates 21 and 22, has an opening 28 between the two side plates 21, 22 at the bottom of the center section 16. Moreover, a rectangular opening 30 is provided near the first end at the top of the inner seat 2. In addition, a pair of first pivoting holes 24 at the second end 20 of the inner seat 2 and a pair of second pivoting holes 25 at the center section 16 of the inner seat 2 are provided. Also, a pin boss 29 with a through hole 27 at its center is provided near the first end 10 and on the top of the inner seat 2. What is more, a positioning head 26 having an engaging fork 261 is provided at the first end 10 of the inner seat 2.

The first fastener 3 having a pivoting hole 31 at its center portion is divided into a first section 32 and a second section 33 taking the pivoting hole 31 as the borderline. And the first fastener 3 is contained in the containing space 23 and is pivotally connected to the inner seat 2 at the pivoting holes 25. In addition, a hook 34 having an inclined lead surface 341 is provided at the end of first section 32 such that the hook 34 is exposed through the opening 28 at the bottom of the inner seat 2. Besides, a stub 35 (shown in FIG. 4) is provided at the top and near the end of the first section 32 for mounting and positioning the spring 5 that will be described later.

The second fastener 4 having a convex push button 45 positioned on its top surface is divided into a first section 36 and a second section 37. And the second fastener 4 having a convex portion 43 at the bottom of the second section 37 and a pivoting hole 33 at the end of the second section 37 is also contained in the containing space 23. Moreover, the second fastener 4 is pivotally connected to the inner seat 2 at the first pivoting holes 24 through the pivoting hole 33. In addition, the second fastener 4 also seats on the top of the second section 37 by contacting the convex portion 43 to the second section 37. Moreover, a hook 41 having an inclined lead surface 411 is provided at the end of section 36 such that the hook 41 is exposed through the opening 30 at the top of the inner seat 2. Besides, a stub 44 is provided at the bottom of the first section 36 of the second fastener 4 for mounting and positioning the spring 5 that will be described latter.

Figure 4:
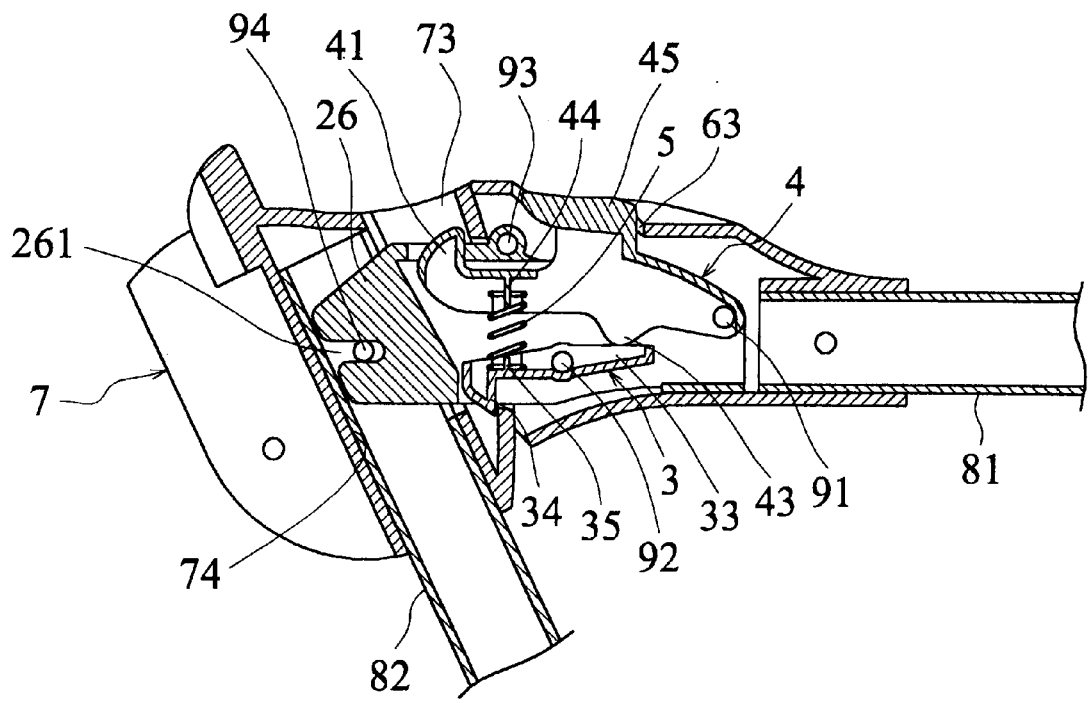
FIG. 4 is an assembled cross-sectional view of the combined handrail-and-frame structures of baby stroller in attaching condition according to a preferred embodiment of the present invention.

FIG. 4 is an assembled cross-sectional view of the combined handrail-and-frame structures of baby stroller in attaching condition according to a preferred embodiment of the present invention. As shown in FIG. 3 and FIG. 4, a spring 5 mounting in between the first fastener 3 and the second fastener 4 and positioning at the stub 35 and 44 at the first fastener 3 and the second fastener 4 respectively is provided.

The housing 6 includes a first end 60 and a second end 68. The first end 61 of the housing 6 is an open end while the second end 62 is connected to a tube-connecting handrail 81. The open end 61 (the first end 60) of the housing 6 is slipped on the inner seat 2 which contains the first fastener 3 and a second fastener 4. An opening 63 is provided at the top portion of the housing 6 for accommodating the convex push button 45. In addition, mounting holes 66, 65, 64 are provided on the two side surfaces of the housing 6 corresponding to the first pivoting hole 24, the second pivoting hole 25, and the through hole 27 respectively.

The engaging seat 7 having two side surfaces 71 and a vertical surface 72 includes an engaging portion 73 and a tube-connecting portion 74 formed in the inner portion of the engaging seat 7. An opening 75 at the vertical surface 72 and a slit 76 in the engaging portion 73 are provided wherein the opening 75 and the engaging portion 73 are internally connected. The opening 75 includes a first edge 77 and a second edge 78 for the hook 34 and 41 respectively to be hooked up. The tube-connecting portion 74 is to be inserted by the frame 82 and is tightened up by rivet pin 94 while the slit 76 is for clipping the 261 for holding the engaging fork 261 in horizontal direction. In addition, a rivet hole 79 with a rivet pin 94 is also provided on the side surfaces 71 wherein the rivet pin 94 is also functioned as positioning member to be hooked up by the engaging fork 261.

When it comes to assembling, the first fastener 3 is first put in the containing space 23 of the inner seat 2 such that the pivoting hole 31 is aligned with the second pivoting hole 25. Then, the second fastener 4 is put in the containing space 23 and seated on the top of the first fastener 3 having the convex portion 43 contacting the top surface of the second section 37 such that the pivoting hole 42 is aligned with the first pivoting hole 24. The hook 41 is exposed up from the inside of the inner seat 2 through the rectangular window 30. In addition, a spring 5 is mounted between the first fastener 3 at the stub 35 and the second fastener 4 at the stub 44. Then, the open end 61 (the first end 60) of the housing 6 is slipped on the inner seat 2 that contains the first fastener 3 and a second fastener 4 such that the convex push button 45 is exposed through the opening 63. A rivet pin 93 is employed to insert through the mounting hole 64 and the through hole 27. A rivet pin 92 is employed to insert through the mounting hole 65, the second pivoting hole 25, and the pivoting hole 31. Also, a rivet pin 91 is employed to insert through the mounting hole 66, the first pivoting hole 24, and the pivoting hole 42. In this way, the first fastener 3, the second fastener 4, the inner seat 2, and the housing 6 are riveted together by the rivet pins 93, 92, and 91. Finally, the whole assembly 8 is engaged with the engaging seat 7 by inserting into the first opening 75. As the assembly 8 is inserted into the first opening of the engaging seat 7, the engaging fork 261 of the positioning head 26 is hooked up to the rivet 94 for vertical positioning. And the hook 34 and hook 41 are locked up to the first edge 77 and second edge 78 respectively.

Figure 5:
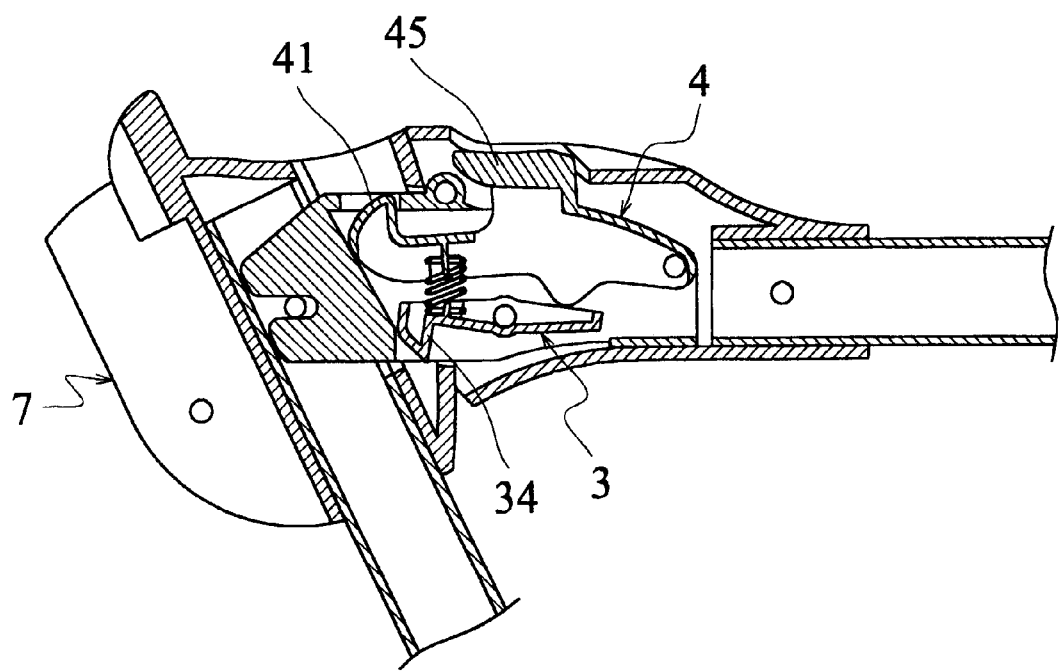
FIG. 5 is an assembled cross-sectional view of the combined handrail-and-frame structures of baby stroller in detaching condition according to a preferred embodiment of the present invention.

FIG. 5 is an assembled cross-sectional view of the combined handrail-and-frame structures of baby stroller in detaching condition according to a preferred embodiment of the present invention. As shown in FIG. 5, when it comes to detaching the "assembly 8" from the "engaging seat 7", one can unlock the hooks 41 and 34 by pressing the "convex push button 45". As the "convex push button 45" is pressed, the second fastener 4 is rotated with respect to the hinge at the pivoting hole 42 in counter-clockwise direction to unlock the hook 41 from the second edge 78 of the first opening 75 of the "engaging seat 7". In the meantime, the second section 33 of the first fastener 3 is pushed down by the convex portion 43 of the second fastener 4 to rotate with respect to the hinge at the pivoting hole 31 in clockwise direction. Therefore, the first fastener 3 presses against the spring 5 to unlock the hook 34 from the second edge 78 of the first opening 75 of the "engaging seat 7".

As shown in FIG. 5, when it comes to attaching the "assembly 8" to the "engaging seat 7", the first end 10 of the inner seat 2 is pushed to insert into the slit 76 and is hooked up to the rivet pin 94. In the meantime, the hooks 34 and 41 are snapped in to hook up to the first and second edges 77, 78 at the first opening 75 of the engaging seat 7. This snap-in action is through the sliding of the inclined lead surfaces 341, 411 at the first and second edges 77, 78 respectively. And the spring 5 is first compressed to make the hooks 34 and 41 get in the first opening 75 then released to let hooks 34 and 41 hook up to the first and second edges 77, 78.

To summarize the foregoing statement, the combined handrail-and-frame structures of baby stroller of the present invention has the following advantages:

1. The locked up action of the hooks is positive and stable.
2. The positioning head together with the engaging seat can provide vertical and horizontal positioning.
3. The attaching and detaching operations are quick and convenient.
4. The good aesthetic perception of the invention without any convex part in the outer appearance can improve the quality level of the product.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A combined handrail-and-frame structure of a baby stroller comprising:
   an inner seat having two parallel side plates and a containing space between the two plates comprises a first end, a second end, and a center section wherein a rectangular opening is provided near the first end and at the top of the inner seat, and an opening is also provided between the two side plates in the center section and at the bottom of the inner seat, and a pin boss with a through hole at its center is provided on the top of the inner seat;
   a first fastener having a pivoting hole at its center portion is pivotally connected to the inner seat, and is contained in the containing space, and the first fastener is also divided into a first section and a second section taking the pivoting hole as the borderline wherein a hook is provided at the end of the first section;
   a second fastener having a convex push button on the top is contained in the containing space and is divided into a first section and a second section wherein a hook is provided at the end of the first section, and the second fastener is also pivotally connected to the inner seat at a pivoting hole provided at the end of the second section, and the second fastener is put on the top of the first fastener by contacting the convex portion formed at the bottom of the second section to the top surface of the second section of the first fastener;

a spring mounted between the first fastener and the second fastener at the stubs each provided at the first fastener and the second fastener respectively;

a housing having an opening at the top portion to accommodate the convex push button includes a first end and a second end wherein the first end is an open end that can slip on to cover a portion of the inner seat and expose the first end of the inner seat while the second end can connect to the handrail; and an engaging seat having an engaging portion.

2. The combined handrail-and-frame structure of a baby stroller of claim 1 wherein a slit is provided for holding the positioning head in horizontal direction.

3. The combined handrail-and-frame structure of a baby stroller of claim 1 wherein a positioning head having an engaging fork is provided at the first end of the inner seat, and a rivet pin is also provided to be hooked up by the engaging fork for holding the positioning head in vertical direction.

4. The combined handrail-and-frame structure of a baby stroller of claim 1 wherein an inclined lead surface is provided at each of the hooks of the first and the second fastener respectively to facilitate the snap-in action of the hooks in the engaging seat.

5. The combined handrail-and-frame structure of a baby stroller of claim 1 wherein a stub is provided at the first and second fasteners respectively for mounting and positioning the spring.

6. The combined handrail-and-frame structure of a baby stroller of claim 1 wherein a tube-connecting portion is provided for connecting to the handrail.

* * * * *